United States Patent [19]
Bales et al.

[11] Patent Number: 4,661,974
[45] Date of Patent: Apr. 28, 1987

[54] AUTOMATIC ROUTE SELECTION OF A PRIVATE TELEPHONE NETWORK PATH ON THE BASIS OF A PUBLIC TELEPHONE NETWORK NUMBER

[75] Inventors: Bruce M. Bales; Steven M. London, both of Boulder; Nancy K. Schmidt, Thornton, all of Colo.

[73] Assignees: AT&T Company; AT&T Information Systems Inc., both of Holmdel, N.J.

[21] Appl. No.: 600,148

[22] Filed: Apr. 13, 1984

[51] Int. Cl.$^4$ .......................... H04M 3/38; H04M 7/14
[52] U.S. Cl. .................................... 379/198; 379/221; 379/225
[58] Field of Search .......... 179/18 AD, 18 B, 18 EA, 179/18 EB, 8 R, 7.1 R, 18 D, 18 DA

[56] References Cited
U.S. PATENT DOCUMENTS

| | | | |
|---|---|---|---|
| 4,162,377 | 7/1979 | Mearns | 179/18 D |
| 4,163,124 | 7/1979 | Jolissaint | 179/18 D |
| 4,224,477 | 9/1980 | Perkinson et al. | 179/18 ET |
| 4,313,036 | 1/1982 | Jabara et al. | 179/18 AD |
| 4,332,982 | 6/1982 | Thomas | 179/7.1 R |
| 4,348,554 | 9/1982 | Asmuth | 179/18 B |
| 4,415,773 | 11/1983 | Martin | 179/18 AD |
| 4,464,543 | 8/1984 | Kline et al. | 179/8 R |
| 4,486,626 | 12/1984 | Kohler | 179/18 DA |
| 4,577,066 | 3/1986 | Bimonte et al. | 179/18 B |
| 4,594,477 | 6/1986 | Noirot | 179/18 AD |

OTHER PUBLICATIONS

"A Sophisticated Switched Service" (Katz et al.) and Modifying No. 1 ESS for Enhanced Private Network Service (Anderson et al.), *Bell Laboratories Record*, Feb. 1979, pp. 38–52.
"Expanding the Role of Private Switching Systems", Bush et al., *Bell Laboratories Record*, Oct. 1979, pp. 243–248.
"GTE Private Interconnect Networks, Systems and Solutions",(3 papers), Nat'l Telecom. Conf., New Orleans, Nov. 1981.
"Railroad Firm Reroutes Long Distance Calls with an Efficient, Integrated Network", *Telephony*, Mar. 7, 1983, pp. 32, 33, 36.

Primary Examiner—Thomas W. Brown
Attorney, Agent, or Firm—John C. Moran

[57] ABSTRACT

A data structure and program routines for use in a private branch exchange telephone system (PBX) for automatically routing calls via a private telephone network in response to a dialed public telephone network number and for restricting outgoing calls from the PBX to specific public network telephone stations. In a large corporate PBX switching network interconnected by both a public telephone network and a private telephone network, a telephone set connected to one PBX system establishes a switch connection through the private network by dialing the public telephone network's number for a destination telephone set connected to another PBX system. In response to the dialed number, the first PBX system automatically determines that the destination telephone set can be reached via the private telephone network and automatically converts the dialed public telephone network number to a private telephone network number designating the destination telephone set. The data structure allows access by PBX telephone sets to designated groups of telephone stations or specific individual telephone stations connected to the public telephone network to be restricted. In addition, if a PBX telephone set attempts to dial a restricted public telephone network station, the system first verifies that the dialed station is restricted to that particular PBX telephone set and then provides a procedure whereby the telephone user can enter a personal authorization code to enable the user to complete the call.

31 Claims, 11 Drawing Figures

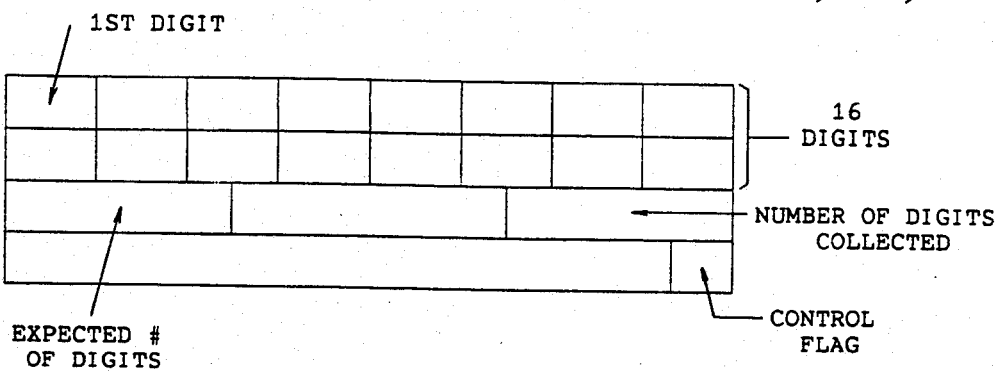
OR 501
*FIG. 5*
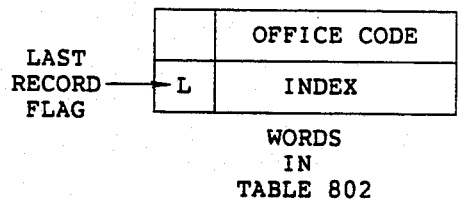
WORDS IN TABLE 802
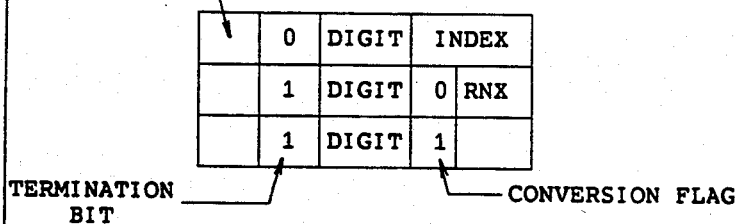
THREE FORMATS
OF WORDS IN
TABLES 803, 904
905, AND 906
*FIG. 11*

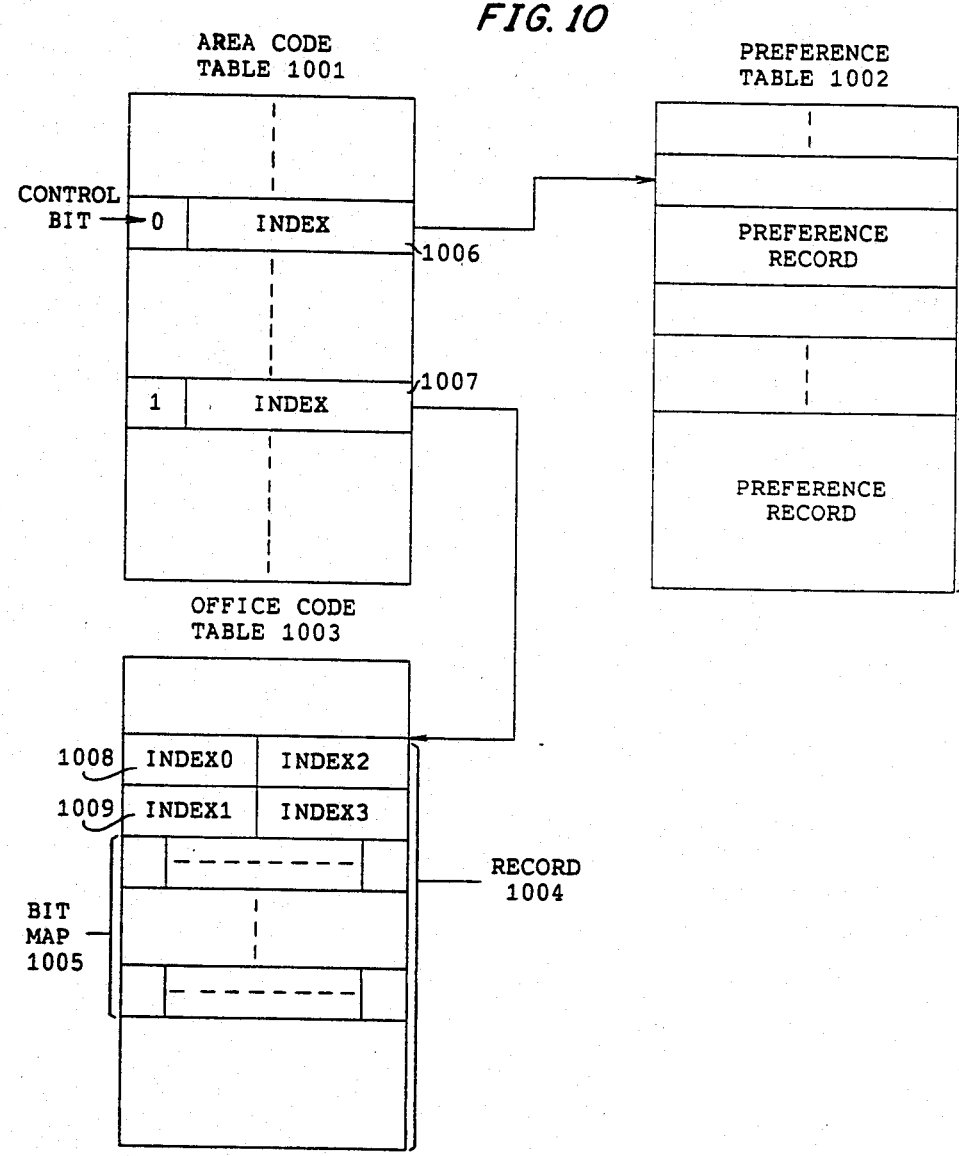

AUTOMATIC ROUTE SELECTION OF A PRIVATE TELEPHONE NETWORK PATH ON THE BASIS OF A PUBLIC TELEPHONE NETWORK NUMBER

TECHNICAL FIELD

This invention relates to a system for establishing a communication path between two subscriber stations each interconnected to a different switching system and more particularly to a system for automatically establishing such a communication path over a private telephone network in response to dialed digits that represent the public network telephone number of another subscriber station.

BACKGROUND OF THE INVENTION

In many applications there is a need for distributed Private Branch Exchanges (PBXs) in corporate sites which are remotely located from one another. Ideally, a caller at one such facility should be able to directly dial an extension at another facility. This, of course, can be accomplished by placing a call over the public telephone network after first gaining access to an outgoing telephone central office trunk and then dialing the appropriate area code and office code plus the extension desired. In addition, if the facilities are interconnected by a private telephone network, then the call can also be placed by dialing a single digit which gains access to a trunk connected to the private network and then dialing the location code which is peculiar to the private network plus the desired extension. For example, to place a call to a particular business telephone set over the public network, a person at a PBX dials 9, then the digit 1, area code 303, central office number 538, and the extension. Whereas to place such a call over the private telephone network which services that business telephone, a person dials 8, location code 374 and the extension.

In PBX systems, it is known to do automatic route selection among the various trunks which make up the public telephone system in order to minimize the cost of a long-distance telephone call. For example, in the United States, American Telephone and Telegraph, Inc. provides trunks of different classes which are leased at different rates, depending on the class of service. Specifically, Full Business Day (FBD), Wide-Area Telephone System (WATS) trunks are available at one tariff schedule, Measured Time (MT) WATS trunks are available at a different schedule, and Direct-Distance Dialing (DDD) trunks are available at still another tariff schedule. One such prior art, automatic route selection method, is disclosed in U.S. Pat. No. 4,163,124, which issued to C. H. Jolissaint. The automatic route selection described in the Jolissaint patent is utilized in another prior art PBX arrangement as disclosed in U.S. Pat. No. 4,313,036, which issued to M. D. Jabara, C. H. Jolissaint, D. Lieberman, and J. D. Edwards. The Jabara system utilizes Jolissaint's route selection method for selecting routes among distributed PBX systems.

In the corporate setting, the requirement of establishing a telephone connection between two corporate sites by dialing either the public network or private network set of numbers is troublesome, because two sets of numbers must be remembered or looked up for each site before a call can be placed. Whereas this problem can be handled where there are only a limited number of PBX sites, it becomes unacceptable when there are hundreds of PBX sites. In particular, in the retail corporate environment where the public telephone number is listed in numerous documents, the trouble of having to look up the private network number is unacceptable. The result is that employees use the public telephone network, resulting in higher costs to the retail corporation since it is more expensive to make calls over the public telephone network rather than the private telephone network. Jabara's system allows for automatic route selection with respect to the public network with a given public network number but does not make provisions for converting a public network number into a private network number in order to perform route selection over a private network.

Another problem which has existed in prior art PBX systems is the problem of restricting outgoing calls with sufficient specificity to allow employee access to the public telephone network but to prohibit certain popular but not work-related telephone numbers such as the weather or sports information telephone numbers. Within the prior art, it is known to be able to restrict all outgoing calls or to be able to restrict calls to given central offices. However, it is not known to be able to restrict calls to a particular telephone number or to a particular set of telephone numbers without restricting the calls to that particular central office. These limitations present serious problems for the employer who wishes to restrict employee access to a particular number not work-related in a large metropolitan area in which his employees may well have business reasons for calling numbers within the same central office as that particular telephone number.

Therefore, there exists a need for a PBX system which is capable of performing automatic route selection not only within different classes of the trunks which are provided by the public telephone network but also having the capability to provide a communication path over a private network in response to a dialed public telephone number. Furthermore, there exists a need for the capability of restricting outgoing calls from a PBX system on the basis of dialed telephone numbers. Further, these capabilities must be provided in such manner so as to minimize the amount of memory required and the amount of computer time necessary to execute the required software procedures.

SUMMARY OF THE INVENTION

The foregoing problems are solved and a technical advance is achieved in accordance with the principles of this invention incorporated in an illustrative method and structural embodiment in which a plurality of PBX systems interconnected by both a public telephone network and a private telephone network allow a telephone set connected to one of the PBXs to establish a communication path through the private network by dialing the public telephone network number for a destination telephone set connected to another PBX. Advantageously, the first PBX system automatically determines that the destination telephone set can be reached via the private telephone network and automatically converts the dialed public telephone network number to the private telephone network number. In addition, each PBX system has the capability of restricting the establishment of a communication path to individual public telephone network stations or unit on the basis of a dialed public telephone network number.

The exemplary method establishes the communication path from the telephone set through the private telephone network in response to the dialed public telephone network number by performing the following steps. First, the dialed digits are collected from the telephone set; and then, a subset of the dialed digits are decoded to determine whether the telephone set is attempting to access the public telephone network. If the telephone set is attempting to access the public telephone network and the communication path can be established through the private telephone network, the dialed digits are translated to the private telephone network number designating the other telephone set, and the communication path is established through the private telephone network.

Advantageously, before the call is established, the method verifies that the telephone set is authorized to make a call over the communication path. If the telephone set is not authorized to make this type of call, then intercept tone is transmitted to the telephone set indicating to the user of the telephone set that this set cannot access the communication path.

In addition, if the set is not authorized to access the communication path, the user is allowed to dial a user authorization code with the necessary authorization level in order to complete the call over the communication path.

Advantageously, the method restricts a PBX telephone set from placing calls to certain designated public telephone units such as a weather information unit via the public telephone network. When a telephone set connected to the PBX attempts to establish a communication path to the public telephone unit, dialed digits are first collected designating the public telephone unit; and then, these digits are analyzed to determine whether or not restriction control is present. If restriction control is present, the facility restriction level for the PBX is compared with the authorization level of the telephone set; and intercept tone is transmitted to the set if the station's authorization level is less than the facility restriction level.

In addition, before intercept tone is transmitted to the telephone set, the user of the telephone set is given the opportunity to dial a user authorization code. If the latter code is greater than or equal to the facility restriction level, the communication path is established between the telephone set and the public telephone unit.

Advantageously, a common data base structure is provided for allowing the implementation of both the conversion of the public telephone number to the private telephone number and for doing the control restriction function. The data in the data base is stored relative to digits representing a dialed public telephone network number. The latter consists of an area code, an office code, and remaining digits. The data structure comprises an area code table and an office code table each associated with the area code and office code, respectively, and digit tables each associated with individual digits of the remaining dialed digits. To establish a communication path from one telephone set to another telephone set each connected to a different PBX through the private telephone network in response to digits dialed designating the public telephone network, the method first determines whether or not a communication path exists through the private telephone network by searching the area code table with the area code. If a match is found, an index pointer associated with the matched location is then utilized to access the office code table where a search is performed utilizing the office code. If the office code matches the contents of a memory location within the office code table, an index pointer stored in an associated office code memory location is utilized to index into the first digit table.

Advantageously, each digit table has a stored digit that is compared to the dialed digit associated with that digit table, a termination bit indicating that the searching operation is to cease, and a control flag indicating that there is control restriction on the communication path. The corresponding dialed digit for a particular digit table is used to search the digit table starting at a point indicated by an index from a previous table. If no match is found, this indicates that a communication path through the private telephone network does not exist for this particular dialed public telephone network number. If a match is detected and the termination bit is set, then the private network location code is contained within the matched memory location and is utilized to route the communication path through the private telephone network.

Advantageously, to do the control restriction function, the method performs the following steps. First, the dialed digits are collected and then the existence of restriction is checked by searching through the area code and office code tables, to determine if the dialed are code and office codes match data stored in these tables. Next, the digit tables are searched until the termination bit is detected in a matched memory location indicating that the searching operation should stop. If the control bit is also set in the matched memory location, the communication path is restricted; but if the control bit is not set in the matched memory location, then the path is unrestricted. If no match is found while searching a table, this indicates that the call is not restricted and the communication path can be established.

The structural embodiment for establishing a communication path in response to a dialed public telephone network number between two telephone sets each connected to a different PBX through a private telephone network is performed in the following manner. The originating PBX assigns a software originating record to the telephone set for collecting the dialed digits. A software routine is then used to decode a subset of the dialed digits to determine whether the telephone set is attempting to access the destination telephone set via the public telephone network. Next, another routine determines whether or not a communication path can be established through the private telephone network and translates the dialed public telephone network number to the private telephone network number utilizing a conversion subroutine. The PBX under software control then establishes the communication path between the two telephone sets through the private telephone network.

BRIEF DESCRIPTION OF THE DRAWING

FIG. 5 illustrates the structure of a memory-based originating register;

FIGS. 8 through 10 illustrate memory-based tables for use with our invention; and FIG. 11 illustrates the format of data stored in the tables of FIGS. 8 and 9.

DETAILED DESCRIPTION

Figure 1:
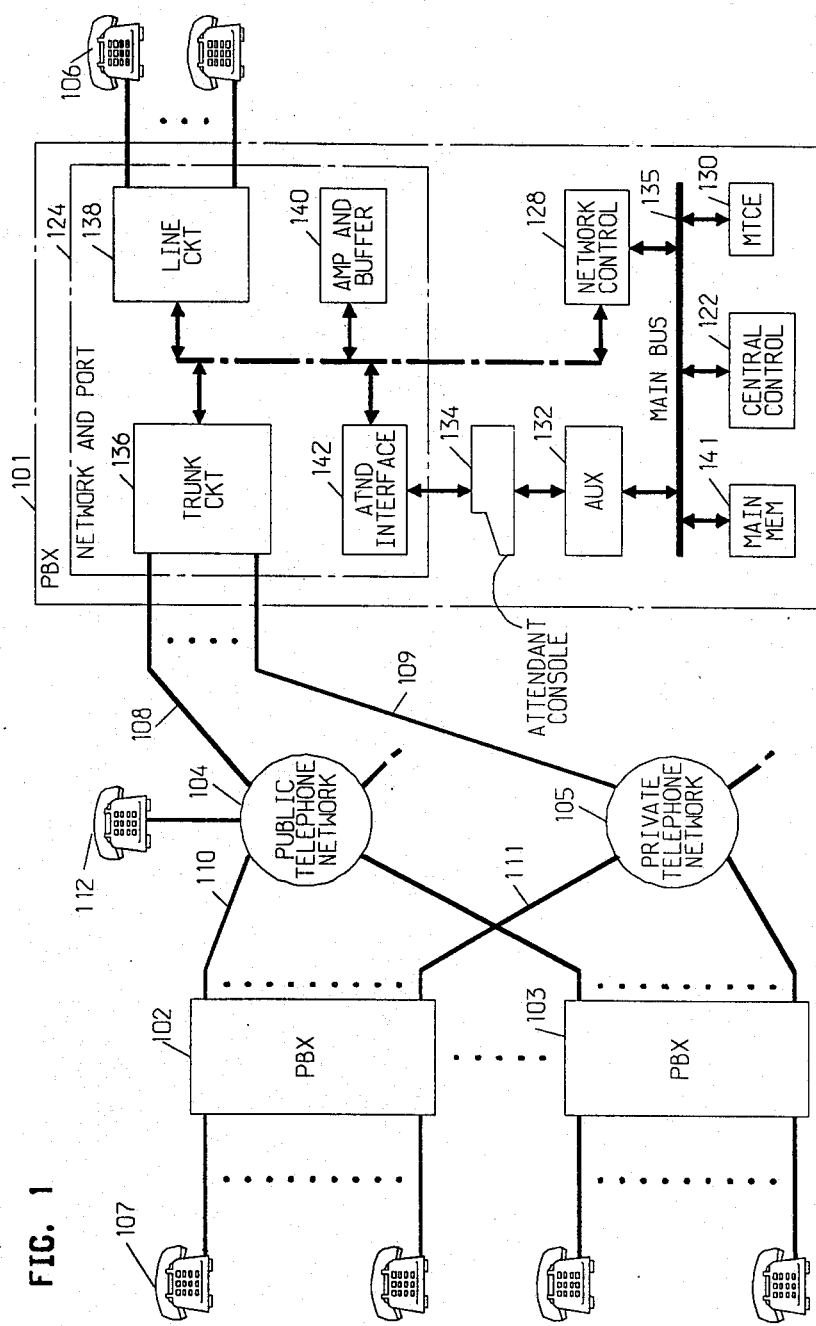
FIG. 1 is a block diagram of a corporate PBX switching network in accordance with certain principles of our invention.

FIG. 1 illustrates a large corporate switching network having a plurality of PBX, also referred to as switching modes, interconnected by a public telephone network and a private telephone network. The public and private telephone networks can also be primary and secondary networks, respectively. Each PBX 101 through 103 is capable of setting up a switch connection from any telephone attached to that particular PBX to a telephone set connected to another PBX through either public telephone network 104 or private telephone network 105. Each PBX is interconnected to either network by a plurality of trunks of different classes. For example, PBX 101 is interconnected to public telephone network 104 via a plurality of trunks in block 108. Within the corporate network illustrated in FIG. 1, the most economic way to place a call from one PBX to another PBX is through private telephone network 105. PBXs 101 through 103 are geographically distributed throughout the country. PBX 101 is disclosed in U.S. Pat. No. 4,090,237, granted May 16, 1978, to J. O. Dimmick and PBX 102 is disclosed in U.S. Pat. No. 3,978,456 granted Aug. 31, 1976, to J. C. Moran and U.S. Pat. No. 4,415,773 granted Oct. 29, 1981, to M. L. Martin. A general description of the software system used in this type of PBX is described in "The Dimension PBX: Software." C. Chao, J. P. Cicon, K. T. Fong, and W. W. Parker, National Telecommunications Conference, December, 1975. Details of a large corporate network are described in "Development of Electronic Tandem Service (ETS) Features for the Dimension PBX" A. M. Gerish and D. C. Opferman, Proc. IEEE Computer Society, Nov. 6-8, 1979, pgs. 86-93.

As illustrated in FIG. 1, each telephone interconnected to a PBX has both a public network number which consists of an area code, office code, and extension number and a private network number which consists of a location code and the extension digits. For example, telephone set 107 has a public telephone number of (208) 838-8710 and a private network number of 623-8710. In prior art systems, if a user at telephone set 106 wants to access telephone set 107, the user first dials either the access code for public telephone network 104 or the access code for private telephone network 105. If the access code for the public telephone network is dialed, then the user dials (208) 838-8710; or if the access code for the private telephone network 105 is dialed, the user dials 623-8710. In the system of our invention, a user wishing to establish a switch connection through private telephone network 105 to telephone set 107 dials the public telephone network, and the system automatically does the number conversion to convert the dialed number which is (208) 838-8710 to the private telephone network number which is 623-8710. This allows the users of the corporate switching network to know only the public telephone network numbers and not be concerned about what the private telephone network numbers are. If no links are available through the private telephone network 105 to interconnect telephone set 106 to telephone set 107, PBX 101 interconnects the two telephone sets together via the public telephone network 104 assuming that the user at telephone set 106 has the proper authorization.

In addition, PBX 101 can limit access to telephone set 112 which is connected directly to a central office within the public telephone network and which is a popular but non-work related telephone set such as weather information also referred to as a public telephone unit. The corporation needs to restrict access to this particular telephone set so as to reduce the amount of employee time wasted in calling it or to avoid toll charges if a telephone call from PBX 101 to telephone set 112 is a toll charge. In addition, even if the calls are not a toll charge, these calls occupy central office trunks resulting in the corporation having to lease more trunks from the telephone operating company. The corporation restricts access by identifying to PBX 101 the fact that calls to telephone set 112 are to be restricted unless the calling telephone set has the proper authorization level or the user enters the proper authorization code via the telephone set. The same restriction capability also allows the corporation to restrict the users from accessing any given subset of telephones hooked to any number of central offices.

PBX 101 comprises central processor 122 and network and port circuits 124. PBX 101 further comprises a network bus 126, network control circuit 128, maintenance circuit 130, auxiliary circuit 132, and an attendant facility, such as attendant console 113. In addition, PBX 101 comprises a main bus 135 for interconnecting the central processor 122, network control circuit 128, maintenance circuit 130, auxiliary circuit 132, and main memory 143.

Central processor 122 facilitates control of PBX 101 by executing instructions which are part of an executive control program stored in main memory 143. Central processor 122 also facilitates control of call processing by (1) periodically interrogating the status of network and port circuits 124, (2) interpreting a change of status detected within the network and port circuits, and (3) issuing commands to the network and port circuits to advance a call to its next logical state. Central processor 122 communicates with the remaining parts of PBX 101 through main bus 135.

Network and port circuits 124 include dial trunk port circuits 136, line port circuits 138, amplifier and buffer circuits 140, and an attendant interface port circuit 142. Network and port circuits 124 facilitate: (1) the connection of PBX 101 via trunks 108 to public telephone network 104 and the connection to the private telephone network 105 via trunks 109; (2) the provision of on-hook/off-hook status to the network control circuit 128; and (3) reception of commands from central processor 122 which indicates a change of state for a particular one of the port circuits 136, 138, and 142.

The network control circuit 128: (1) senses the status of the network and port circuits 126 to determine the state of a switchhook within telephone 106, for example, which is interconnected through line port circuits 138 and any of several states for trunk port circuits 136; (2) contain a system clock; (3) assign time slots to port circuits 136, 138, and 142; and (4) synchronize existing system connections.

The executive control program facilitates the monitoring of the behavior of PBX 101 and generates a regular and periodic task matrix. A task dispenser program, which receives control from the executive control program, schedules the execution of tasks according to the task matrix generated by the executive control program. Tasks or programs are designed to search for a change of state within PBX 101. The task dispenser program releases control to a specific-oriented program which thereafter returns control to the task dispenser after the assigned task has been completed.

Figure 8:
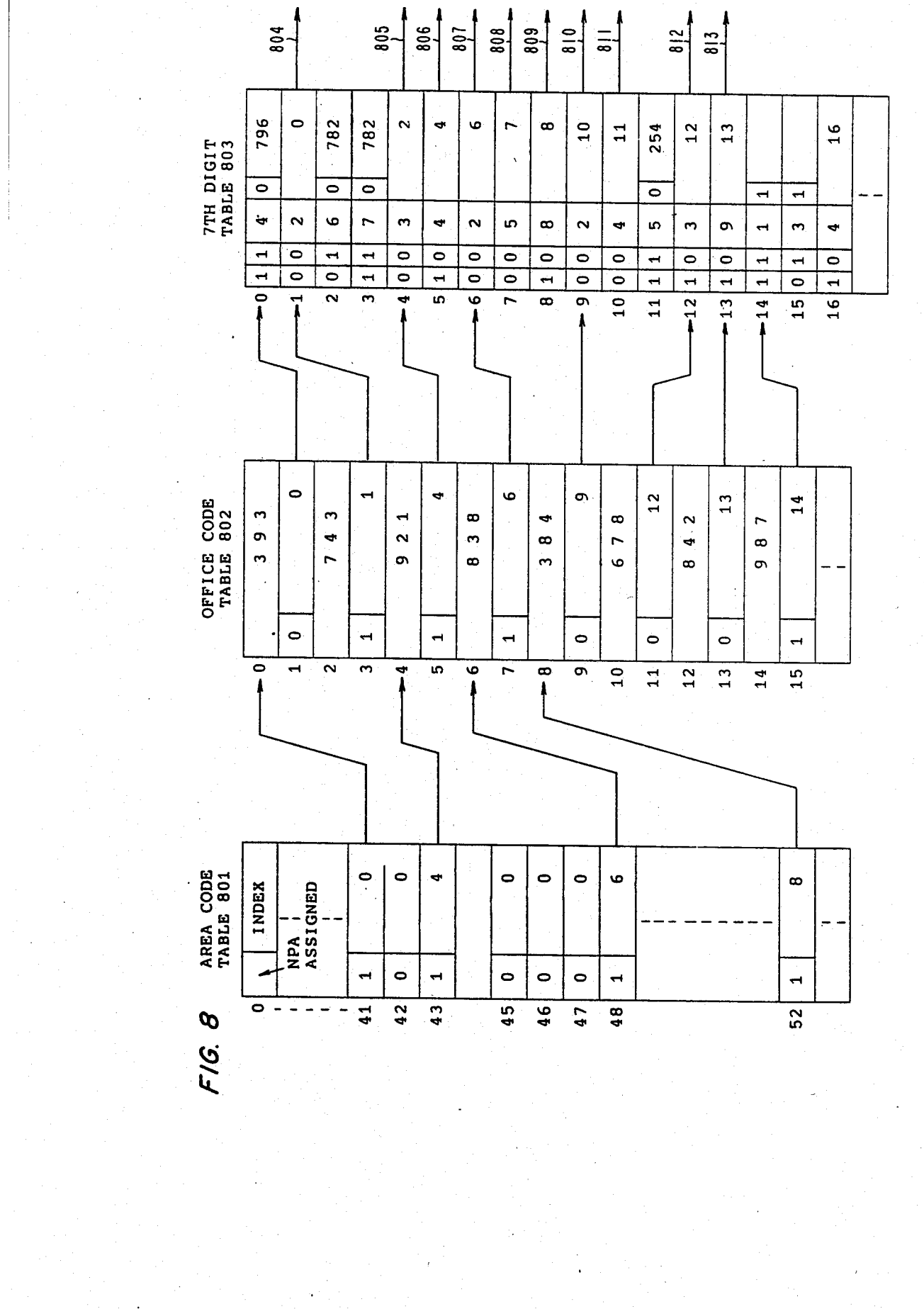
Figure 9:
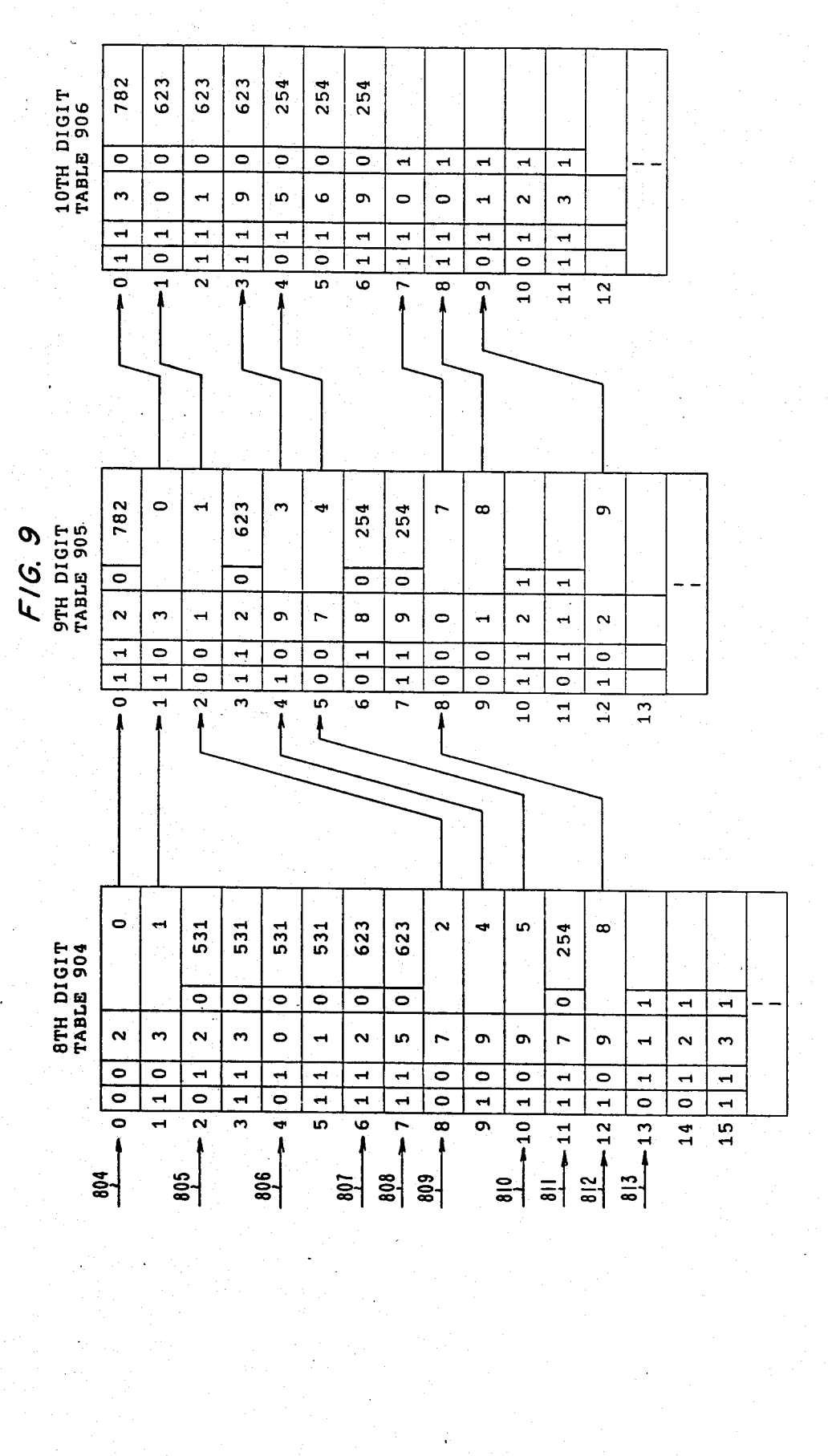

The conversion and control functions are performed by central processor 122 executing the routines illustrated in FIGS. 2, 3, 4, 6, and 7; and these routines utilize conversion and control data stored in tables illustrated in FIGS. 8 and 9. The overall functions performed by these routines is summarized as follows. If an access code for the private telephone network is dialed by the user of a telephone set, central processor 122 under control of the previously mentioned routines handles the call in a conventional manner. However, if the access code for accessing the public network is dialed, these routines control processor 122 in the following manner. First, the routines obtain the area code (208) and the office code digits (838). The routines then interrogate the area code table 801 and determine that area code 208 is assigned. The index associated with area code 208 in table 801 points to a group of office codes in the office code table 802.

Since both the area and the office codes have been found in the tables, there is a possibility that the number presently being dialed is subject to either conversion or control, and the routines must gather the remaining four digits before determining whether or not the conversion or control function is to be performed. If the area code or the office code had not been found, in the tables illustrated in FIGS. 8 and 9, this indicates that neither the conversion or control function is to be performed; and the routines immediately handle this call utilizing the automatic route selection features over the public telephone network.

In the instant example, after the remaining four digits of the number (8710) have been dialed, the routines once again interrogate the tables illustrated in FIGS. 8 and 9. After finding a match in the office code table, the routines index into a group of words in the seventh digit table 803 associated with the digit "8" of the dialed extension. These words are searched until a match is found, and an index into the eighth digit table 904 of FIG. 9 is obtained. This searching and indexing continues until it is terminated in the tenth digit table 906 at word 1. The data in word 1, which will be described in greater detail later, indicates that this is the termination of the searching and also contains the private network location number (623) for use in the conversion function. After the number "623" has been obtained by the routines, the latter route the call over the private telephone network after first checking to ascertain whether or not this call is restricted in any manner.

The restriction control to a telephone number (area code 212, office code 678 and extension 3900, in this example) is accomplished by the software routines in the following manner. First, it is determined that the area code has been assigned by searching area code table 801. Then utilizing the index from table 801 to word 8 of office code table 802, a search is done until a match for the office code is found in word 10. Then an index in word 11 is used to point into seventh digit table 803 where a match is found with the contents of word 12. The index associated with word 12 is then used to index into the eighth digit table 904 where a match is found in word 12. The index in word 12 points to word 8 of ninth digit table 905. A match is found in table 905 at word 8, and an indexing operation into the tenth digit table 906 is performed. In the latter, a match is found and an indication that this call is controlled. The routines then execute the necessary steps to determine whether the telephone set or the user has a sufficient authorization level to allow the call to be completed.

Consider now in greater detail, how PBX 101 establishes a switch connection through private network 105 to telephone set 107 in response to the public number of (208) 838-8710 being dialed. The flow diagrams illustrated in FIGS. 2, 3, and 4 define the steps which must be performed by the control program stored in main memory 143 to convert the dialed public telephone number to the private network number of 623-8710. Telephone aet 106 is initially in facility idle state 201. When telephone set 106 goes off-hook, the proper task within the control program detects this change in state of telephone 106 and assigns a software originating register (OR) 501 located in main memory 143 and illustrated in FIG. 5. After the OR 501 has been assigned to telephone set 106, control is passed to routine 202. Routine 202 utilizes the appropriate task within the control program to collect the access code defining the type of call that the user is making. Depending on the call administration of the PBX, the access code can be of various types comprising a varying number of digits.

After the access code has been dialed, routine 202 passes control to decision block 203 which interrogates the access code. If the access code indicates that the user is attempting to make a local call, then control is tranferred to routine 205; and the call is handled as a local call within the PBX. If the access code for the private network had been dialed, control is transferred to routine 213 which results in the call being handled over the private network.

Since in the instant example, the public network access code has been dialed, decision routine 203 transfers control to routine 231 which sets the expected number of digits field in the OR 501 to a "1" and resets the number of digits collected field in OR 501 to a "0". The control program then enters the automatic route select (ARS) dial state 204 until the appropriate task within the control program determines that the first digit has been dialed. This task then enters the first digit into the first digit field of the OR 501 and transfers control to decision routine 206.

Decision block 206 interrogates the expected number of digits and number of digits collected fields of OR 501 and determines that this is the first digit collected and transfers control to routine 207. Assuming that it is necessary to dial a "1" before access can be gained to the public network, the user has dialed a "1" on telephone set 106 and must dial three more digits for the area code. Based on this fact, routine 207 sets the expected number of digits field equal to "4" and reenters state 204. After three more digits have been collected by the appropriate task, control is transferred to decision routine 206 which once again interrogates OR 501 and transfers control to decision routine 208 since three more digits have been dialed.

Decision routine 208 interrogates the three digits just dialed using well-known techniques to determine whether or not these digits represent an area code. Since the digits dialed are 208, which is an area code, decision routine 208 transfer control to routine 209. The latter determines the number of digits which must be collected in order to obtain the office code. In this case, a total of seven digits must be collected before the office code is dialed since one digit is necessary for the "1" digit, three digits for the area code, and three digits for the office code. Routine 209 sets the expected number of digits field of OR 501 equal to "7" and transfers control back to state 204.

After the next three digits have been collected (838) by the appropriate task within the call control program, control once again is transferred to decision routine 206. By interrogating the expected number of digits and number of digits collected fields of OR 501, decision routine 206 determines that seven digits have been collected and transfers control to decision routine 214. As will be described in a later section, the purpose of decision routine 214 is to determine if a credit card call is being made and to directly transfer control to routine 212 in the event that this type of call is being made. Since in this case, the first digit of OR 501 is not a "0" which indicates a credit card call, control is transferred to decision routine 215.

Figure 6:
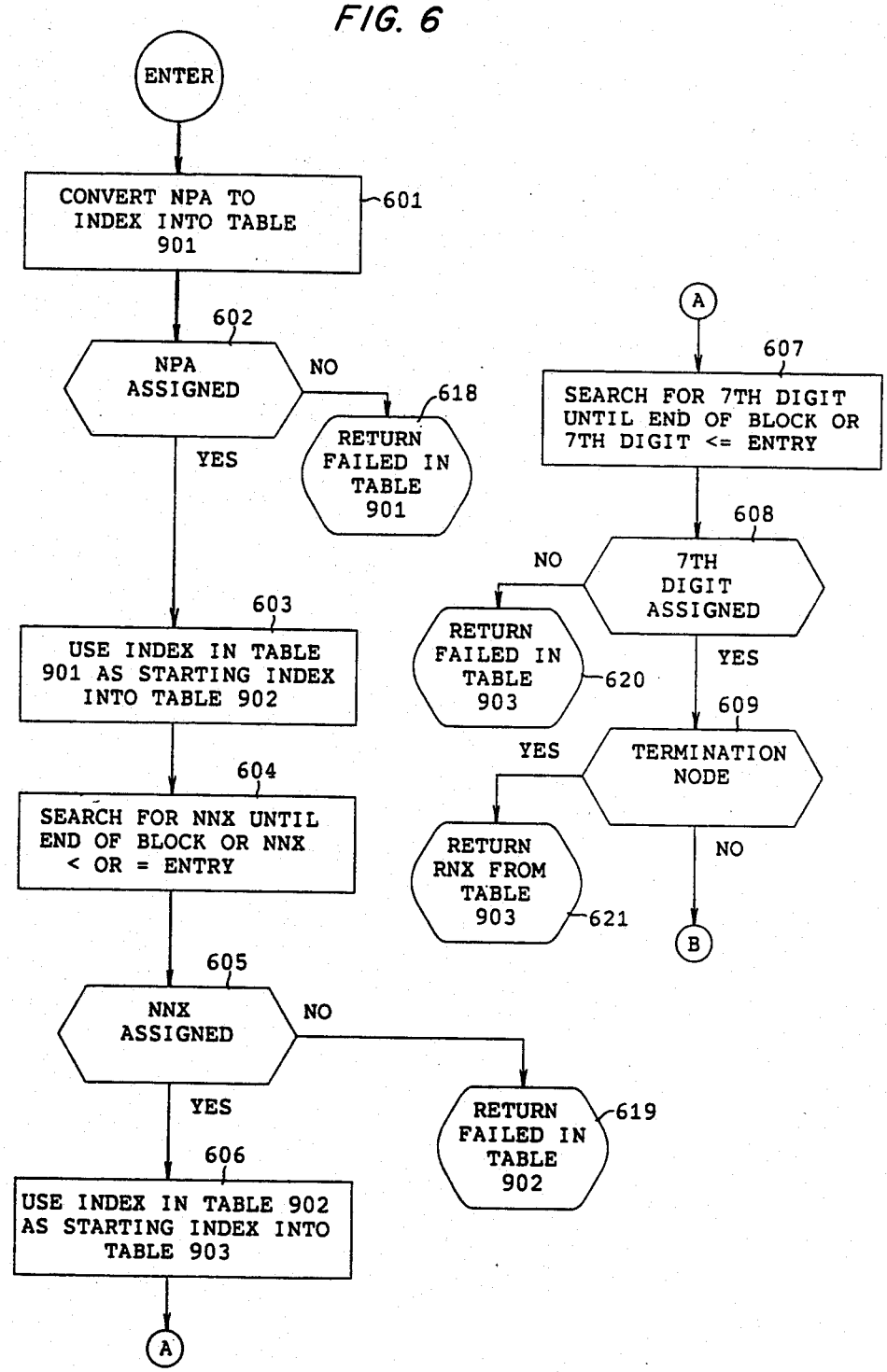
FIGS. 6 and 7 show the flow diagram of the conversion and control subroutine of our invention.
Figure 7:
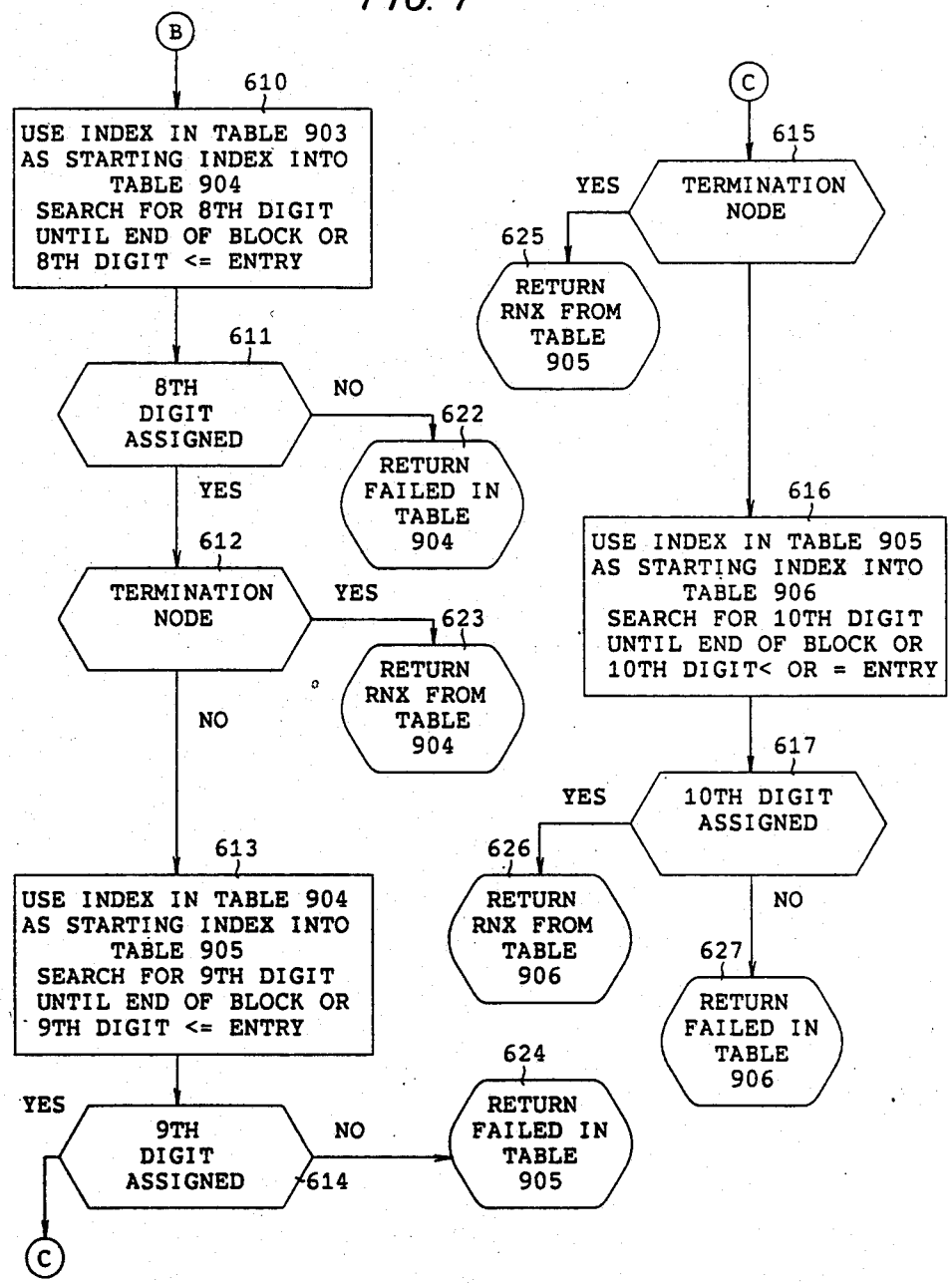

The decision routine 215 uses the conversion/control subroutine illustrated in FIGS. 6 and 7 to determine if the area code and office code, thus far dialed, may be subject to conversion or control. Since the area code and office code dialed are found in the tables 901 through 906, the subroutine returns the indication to decision routine 215 that control or conversion may be warranted on this number. On the basis of this response, decision routine 215 transfers control to routine 228 which inserts an "11" into the expected number of digits field in OR 501. Note, if an access code of "1" was not dialed, routine 228 inserts "10" into the expected number of digits field of OR 501. Routine 228 then transfers control back to ARS state 204.

After the remaining four digits of the telephone number have been dialed, control is transferred to decision routine 206 which in turn transfers control to decision routine 215 via decision routine 214. Decision routine 215 calls the conversion/control subroutine; and the latter returns to decision routine 215 indications that the search was successfull and the conversion is to be performed, and that the private network location code is 623. In response to this information, decision routine 215 transfers control to routine 216. The latter deletes the area code and office code from OR 501 and in place of these codes inserts the location code 623 and rearranges the digits so that contiguous digits are present in OR 501. After performing the previously mentioned functions, routine 216 transfers control to AAR routine 218.

As will be described in greater detail with respect to FIG. 10, AAR routine 218 performs automatic route selection within the private telephone network selecting from among a variety of classes of service each having different economic costs. Normally, the most expensive route available to AAR routine 218 in these tables is to route the call over the DDD class of service of the public telephone network which is a default case. If this route is chosen, the private telephone number must be converted back into the public telephone network number. After selecting a particular class of service as represented by a trunk group, AAR routine 218 transfers control to decision routine 219. The latter interrogates the control flag to see if it is set indicating that the number dialed is restricted. Since this is not the situation in our present example, control is transferred to decision routine 221. Associated with each trunk group is an authorization level referred to as the route Facility Restriction Level (FRL). Decision routine 221 accesses the user's facility restriction level authorization which, at this point, is determined solely by the telephone station set to determine if it is greater than or equal to the route FRL. Assuming that the user's FRL is less than the route's FRL, control is transferred to routines 222 and 223 so that the user is given the opportunity to enter a higher FRL authorization code than that of the station set. The reason is that an upper-level manage may be using, for example, a conference room telephone set which has a very low FRL authorization, whereas the manager himself has a higher personal FRL authorization.

Decision routine 222 checks to make sure that the FRL authorization code has not been previously requested. If it has, then the user is given an intercept tone. Assuming that the authorization code had not been previously requested, control is transferred to routine 223 which gives the user the proper tones and awaits the new authorization code to be entered via dialing. After the authorization code has been entered, routine 223 transfers control to decision routine 219; and from the latter, control is transferred to decision routine 221. Assuming that the entered code is greater than the route's FRL code, decision routine 221 transfers control to 224.

Decision routine 224 determines whether or not AAR routine 218 has chosen to route the call over a DDD class of service rather than the private telephone network. If the call is to be routed over the DDD class of service, control is transferred to routine 225 which by executing well-known techniques, converts the location code of the private telephone network back to the area and office code of the public telephone network. Whether or not the call is being routed over the private telephone network or the DDD class of service via the public telephone network, routine 226 eventually receives control, seizes a trunk in the appropriate trunk group, and outpulses the necessary digits over that trunk to establish the connection.

Before proceeding, consider the following three types of calls. The first type is where the user is attempting to establish contact with the central office operator, the second type is where a credit card call is being made, and the third type of call is where the user is dialing within his own area code. The first type of call occurs when decision routine 203 transfers control to state 204 after inserting into the expected number of digits field of OR 501 a "1". After one digit has been dialed, control is transferred to decision routine 206 which in turn transfers control to routine 207. Since a "0" has been dialed, routine 207 inserts into the expected number of digits to be collected field an "11". Routine 207 then transfers control to state 204. Since the user is attempting to establish a connection with the central office operator, the user dials no more digits; and after 10 seconds, state 204 times out and transfers control to routine 205. After inserting certain data into OR 501, routine 205 transfers control to routine 212 for routing. The call then is handled in a manner similar to that previously described.

In the second type of call, where the user is attempting to make a credit card call, proceeds as previously described for the central office operator call; however, after the user has dialed 11 digits, state 204 transfers control to state 206 which in turn transfers control to decision routine 214. The latter recognizes that a "0" was dialed and transfers control to routine 212 for routing as previously described.

In the third type of call, the user is dialing within his own area code and hence does not dial an area code but rather only an office number. It is necessary for the routines to insert the local area code so that the call may be processed in the normal manner by routine 212. After routines 201 through 203 have been processed for this type of call and three digits have been dialed, control is transferred to decision routine 206 and from the latter to decision routine 208. Decision routine 208 detects that an area code has not been dialed and transfers control to routine 210 which inserts the local area code into the proper digits of OR 501.

After insertion of the local area code, decision routine 211 calls the conversion/control subroutine to determine if there is a possibility of conversion or control for this particular area code and office code. If there is no possibility of conversion or control, control is immediately passed to routine 212 for routing in the normal manner. If there is a possibility of conversion or control, control is transferred to routine 224 which inserts the proper number into the expected number of digits field of OR 501 and transfers control to state 204. The processing of the call then proceeds in the manner previously described. After all the digits have been dialed, control is transferred to decision routine 215 via decision routines 206 and 214. Decision routine 215 determines whether or not conversion or control is required and makes the necessary decisions to pass control to either routine 218 or 212. From either one of these routines, the routing of the call is processed as previously described through routines 219 to 226.

Consider now in greater detail, the manner in which PBX 101 limits access to telephone number (212) 678-3900. Assuming that telephone set 106 has gone off-hook and is dialing the previously mentioned number, facility idle state 201 detects this off-hook status, seizes software OR 501, and transfers control to routine 202. After the user has dialed the access code for the public network, control is transferred to state 204 with a "1" having been inserted into the expected number of digits field of OR 501. Assuming that telephone set 112 and PBX 101 are in the same area code, the user proceeds to dial "6". Upon receipt of the digit 6, state 204 transfers control to decision routine 206 which in turn transfers control to routine 207. The latter examines the dialed digit and determines that it is neither a "0" or a "1" which would have indicated either an central office operator/credit card call or a long-distance telephone call and inserts a "3" into the expected number of digits field of OR 501 and returns control to state 204.

After three digits have been collected, control is transferred to decision routine 206 which transfers control to decision routine 211 via decision routine 208 and routine 210. The latter inserts the local area code. Decision routine 211 calls the conversion/control subroutine. The conversion/control subroutine, as will be described later, finds a match in the area code and office code tables, and in response to this information, decision routine 211 transfers control to routine 227 which inserts a "10" into the expected number of digits field of OR 501 and transfers control to state 204.

After the remaining digits of the number have been dialed, control is transferred to decision routine 215 via decision routines 206 and 214. Decision routine 215 calls the conversion/control subroutine which returns the fact that the call is controlled. In response to the fact that a controlled telephone set has been dialed, decision routine 215 transfers control to routine 217. The latter sets the control flag and transfers control to ARS routine 212. The latter determines the appropriate trunk group to route the call to telephone station set 112 via public telephone network 104 and transfers control to 219.

The purpose of routines 219 through 226 is to determine whether the user has an FRL authorization which allows him to dial a control restricted telephone number. Decision routine 219 transfers control to decision routine 220 since the control flag has been previously set by routine 217. Decision routine 220 compares the user's FRL against the control FRL. The control FRL is the same throughout the system and is determined at the time of the system administration for PBX 101. Assuming that the user's FRL is less than the control FRL, control is transferred to decision routine 222. Since the authorization code has not been previously requested, control is transferred to routine 223 and the latter requests and collects the authorization code.

Control is then transferred to decision routine 220 via decision routine 219. Assuming that the dialed authorization code is greater than the control FRL, decision routine 220 transfers control to decision routine 221. Assuming that the authorization code now is greater than the route FRL, control is transferred to routine 226 via decision routine 224. Routine 226 now establishes the call. Note, if the user had failed to enter an authorization code greater than or equal to both the control and route FRLs, the user would have been given intercept tone via decision routine 222.

Consider now, in greater detail, how the conversion/control subroutine of FIGS. 6 and 7 accesses the tables illustrated in FIGS. 8 and 9 in determining whether or not a dialed number is to be converted or subject to control restrictions. The format of the data stored in tables 802 and 803 and tables 904 through 906 is illustrated in FIG. 11. A record in table 801 consists of a single word, and there is one word for each possible area code. Within each word, the NPA assigned bit being equal to a "1" indicates that a particular area code has been assigned and that the index field points to the start of a group of records in table 802 which contain the office codes assigned to that particular area code. The conversion/control subroutine indexes into table 801 by utilizing the following formula:

$$\text{Index} = N \times 20 + P \times 10 + A$$

where the area code digits are represented by NPA.

Each record in office code table 802 comprises two words. The first word of the record defines the office code and the second word gives the index to be used to index into table 803. A "0" in the L field indicates that this record is the last record of a group of records for a particular area code. Each record in table 803 and tables 904 through 906 consists of one word which has three possible formats as illustrated in FIG. 11. The last word field indicates that the record is the last record of the group when set equal to a "1". The termination bit being equal to a 0, indicates that the search must continue to the next table using the contents of the index field if a match was found with the contents of the digit field. If the termination bit is set equal to a "1" and a match is found with the contents of the digit field, then the contents of the conversion flag bit are examined. If the contents of the conversion flag equals a "0", then the contents of the RNX field represent the location code for the private telephone network. If the contents of the conversion flag field equal a "1", that indicates control and the contents of the RNX field are irrelevant.

Consider how the conversion/control subroutine illustrated in FIGS. 6 and 7 is utilized to perform the necessary conversion function with the previous example where the area code is 208, the office code is 838, and the extension digits are 8710. The office code digits are referred to as "NNX" in FIGS. 6 and 7. Recall that the first time that the subroutines illustrated in FIGS. 6 and 7 are called is when only the area code and the office code have been dialed and the call is performed by routine 215 of FIG. 2. When routine 215 calls the conversion/control subroutine, it transfers to the subroutine via temporary storage locations in main memory 143 the contents of OR register 501 with the digits positions which had not yet been collected filled with an hexadecimal value of "D". When the subroutine returns control to routine 215, it indicates one of two possible conditions. First, the search had been successful and the subroutine is passing information via internal registers of processor 122 indicating whether the search had determined that it was a conversion or a control. If it was a conversion, then temporary memory locations in main memory 143 are utilized to transfer the private telephone network location code. The second condition is where the search failed, and in this case, the subroutine passes to the calling routine the fact that the search failed, and in which table the failure occurred.

When decision routine 215 passes control to the subroutine as illustrated in FIGS. 6 and 7, the subroutine first converts the area code using the previously mentioned formula and obtains an index into table 801 by utilizing routine 601 upon accessing table 801. Decision routine 602 determines whether or not the area code has been assigned by interrogating the NPA assigned field. If the area code had not been assigned, decision routine 602 returns a failure and indicates that the failure occurred in table 801 via block 618. Since word 48 contains a "1" in the NPA assigned field, decision routine 602 transfers control to routine 603 which accesses the index field and obtains an index pointing to word 6 of table 802. Then, routine 603 transfers control to routine 604, and the latter routine utilizes the index to access word 6 of table 802. In comparing the contents of the office code field of word 6 of table 802, routine 604 detects a match between the contents of word 6 (838) and the dialed office code (838). Then routine 604 accesses the index field in word 7 which points to word 6 of table 803. If routine 604 fails to find a match between the dialed office code and the contents of an office code field in the group of records starting with location 6, decision routine 605 returns a failure to decision routine 215 of FIG. 2 via block 619.

Control is now transferred to routine 606 which uses the index stored in location 7 of table 802 to index into the start of the group of records associated with office code 838 in table 803. At this point in time, the seventh digit of the telephone number has not been collected, and an hexadecimal "D" is in the seventh digit of the copy of the digits field from OR 501. Routine 607 commences searching at location 6 attempting to match the contents of the digit field of each word from 6 through 8 with the hexadecimal "D" number. This search, of course, fails and is terminated at word 8 because the last word field is set to a "1" in word 8. Control is transferred to decision block 608 which returns an indication of a failure in table 803 to decision routine 215 via block 620.

Figure 2:
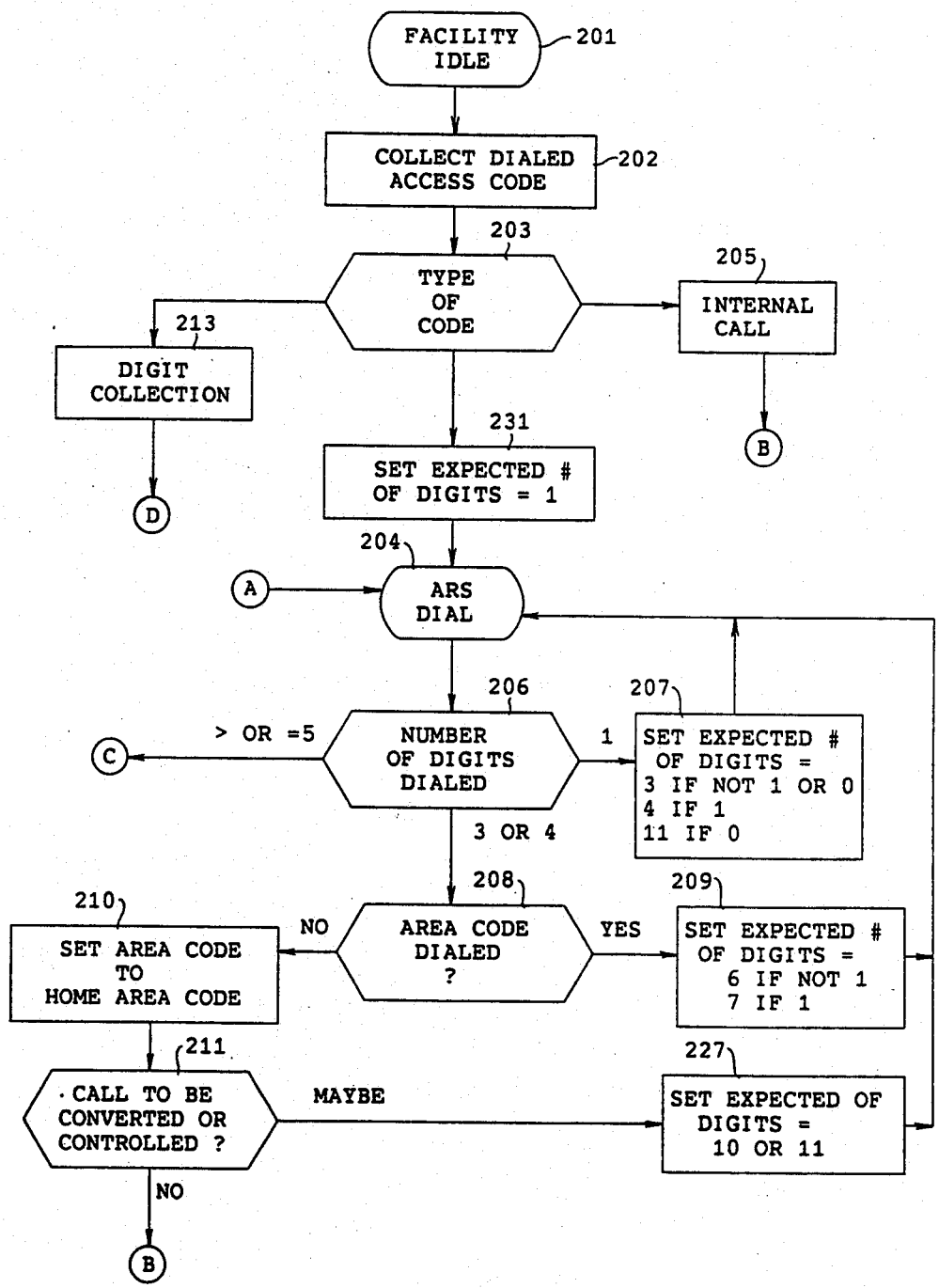
FIGS. 2 through 4 show the flow diagram which illustrates the program procedures for controlling the system illustrated in FIG. 1 in accordance with the principles of our invention.
Figure 3:
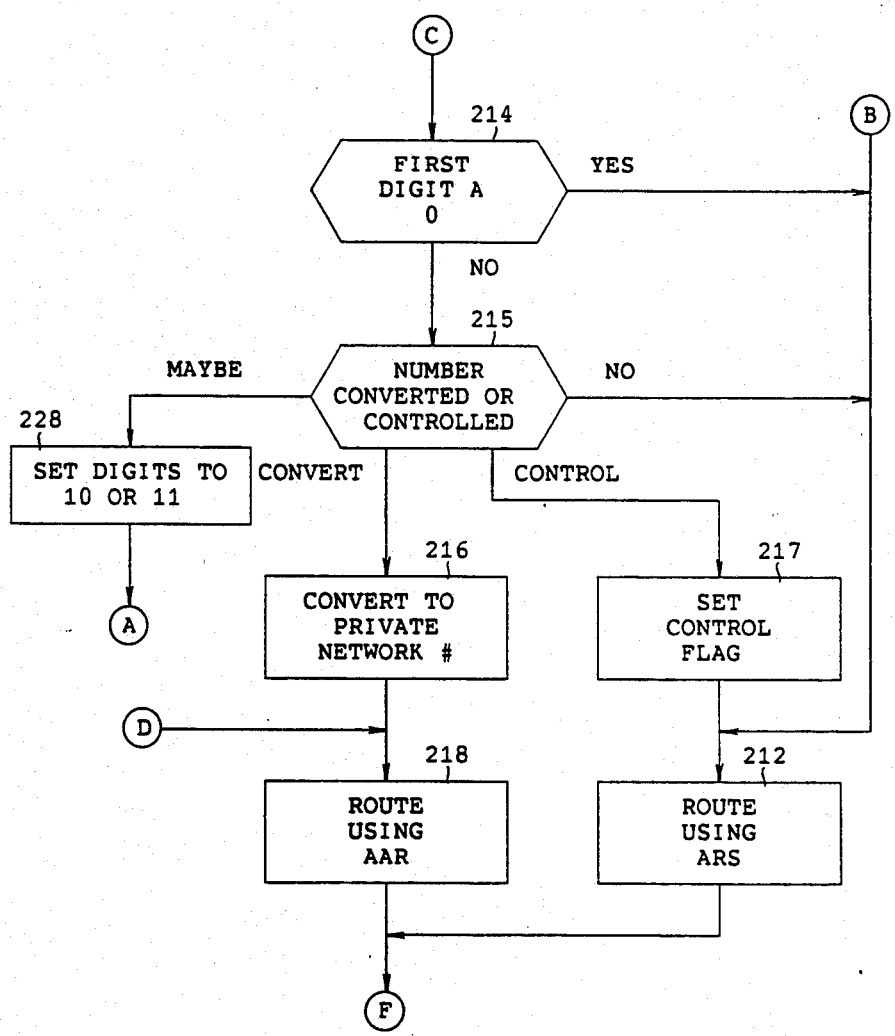
Figure 4:
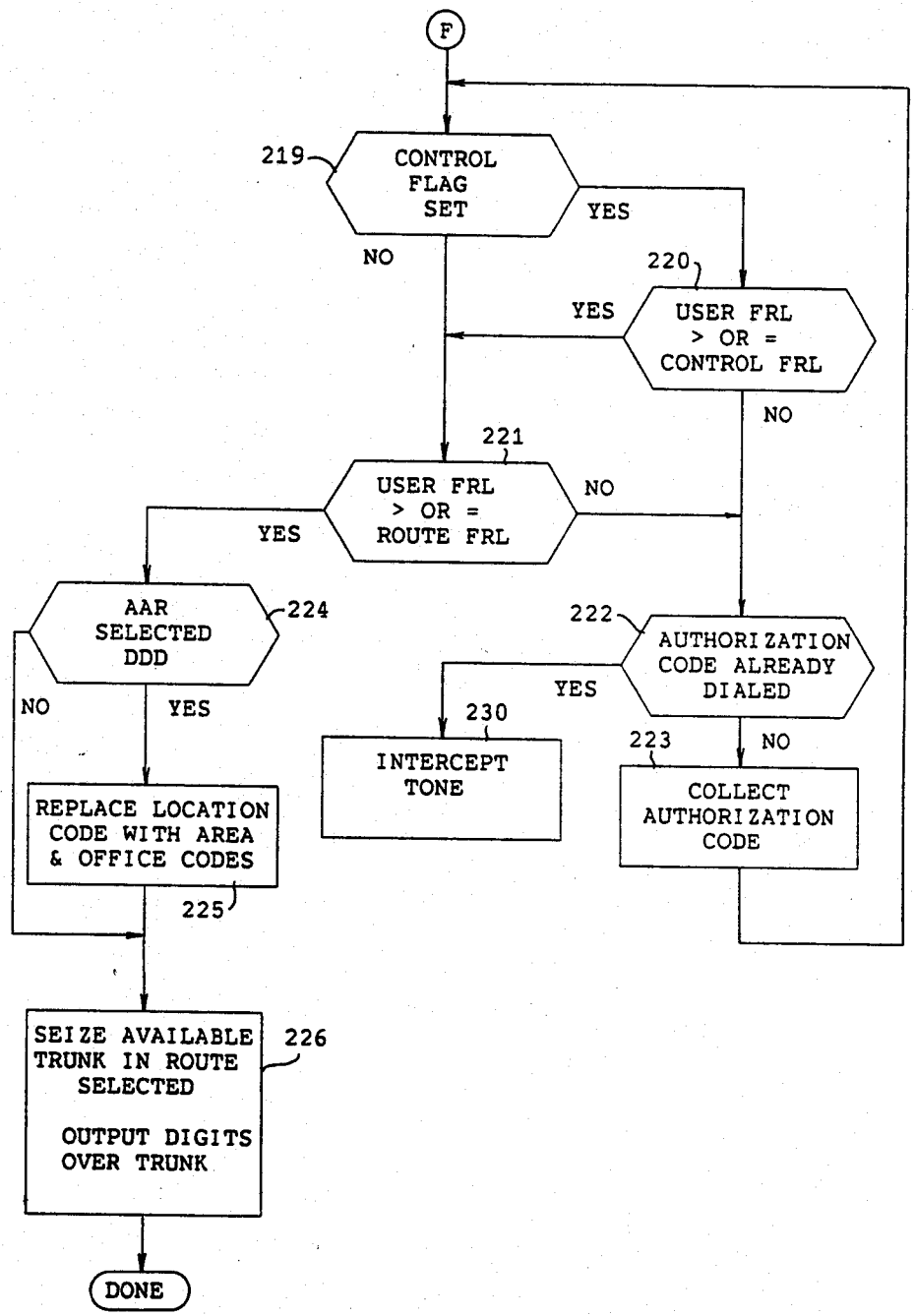

In the previous example, after the conversion/control subroutine had returned control to decision routine 215 of FIG. 2, the latter determines on the basis that the failure occurred in seventh digit table 803 that there may be either conversion or control and transfers control back up to the ARS dial state via the routine 228. After the remaining digits have been collected, control is once again returned to decision routine 215 which calls the subroutine again. Once called, the subroutine searches through tables 801 and 802 as previously described, and beings searching the group of records starting with location 6 in table 803. Since all the digits have now been collected, routine 607 of FIG. 6 finds a match at location 8, and decision block 608 transfers control to decision block 609. The latter checks to see if the termination bit is set to a "1" which indicates that it is unnecessary to search the tables any further since the necessary conversion or control information is contained in location 8.

In the instant case, the termination bit of table 803 is a "0", and decision block 609 transfers control to decision block 610 which utilizes the index of location 8 to index into location 8 of eighth digit table 904. Location 8 is the start of a group of records which consists of four words. Since the eighth digit of the dialed number is a 7, block 610 detects a match at location 8, and decision block 611 transfers control to 612. Decision block 612 determines that the termination bit is not set and transfers control to routine 613 which searches the ninth digit table 905 starting at location 2. Since a match is found at location 2 and the termination bit is not set, control is transferred to block 616 via decision blocks 614 and 615. The latter uses the index of location 2 of table 905 to index into location 1 of tenth digit table 906. A match is found for the tenth digit table 906. A match is found for the tenth digit of the dialed number, and the presence of the private telephone network location number (RNX) field is indicated by the conversion flag being a 0 and this RNX number, 623, is transferred back to decision routine 215 of FIG. 2 via block 626.

Consider another example of converting a public telephone network number to a private telephone network number where the PBX site being called has inward dialing which allows the PBX to automatically collect and interpret the digits so that the call can be automatically switched from the trunk through the PBX. In this example, the number dialed is area code 201, office code 393, and the most significant digit of the extension is a 4. The conversion/control subroutine first indexes into table 801 at location 41 and then indexes into the office code table 802 at location O. Upon searching table 802, routine 604 detects the office code number of 393 at location O and transfers control via decision block 605 to routine 606 which indexes into the seventh digit table 803. Routine 607 then searches the entries in table 803 associated with the office code of 393 which consists only of one entry and routine 607 finds a match at location O. Since the termination bit is set in the matched word and the conversion flag equals a "0", decision block 608 returns a success on searching table 803 and the RNX number of 796 to the calling routine via block 621. It is not necessary to search the remaining tables 904 through 906.

The searching for either a conversion or a control is performed in an identical manner. The difference is that if the conversion flag equals a "0", the conversion bit is not set and no RNX number is returned to the calling routine.

The tables used by ARS routine 212 for routing the calls through the public telephone network are illustrated in FIG. 10. AAR routine 218 uses similar tables for performing the routing of calls through the private telephone network. Routine 212 first indexes into area code table 1001 using well-known methods for indexing into table 801. If the control bit of the word located in table 1001 is a "0", then the system directly indexes into the preference table 1002. However, if the control bit of the word located in table 1001 is a "1", the routine indexes indirectly through office code table 1003 in order to locate the preference record in table 1002.

Preference table 1002 is organized into 64 preference records with each preference record having ten entries. These ten entries define the various classes of service and the order in which the customer wishes to attempt to route calls through these classes of service. The first entry of a preference record is the least expensive way to routing a call to a given location whereas the last entry into a preference record is the most expensive way of routing a call. When ARS routine 212 searches the preferences record, it does it in ascending order attempting to find the least expensive way of routing the call.

If the customer desires that the cals not only be routed on the basis of the area code but also on the basis of the office code, the ARS routine 212 must use the office code table 1003. For example, word 1007 of table 1001 indexes the routine down to the start of record 1004. Once the routine has reached record 1004, it converts the office code into a binary number and uses that number to index bit map 1005. Bit map 1005 has two bits associated with each assigned office code. This 2-bit code defines which of the four indexes located in words 1008 and 1009 of record 1004 should be used for this particular office. These four indexes point into preference table 1002 each to a particular preference record.

It is to be understood that the above-described embodiment is merely illustrative of the principles of the invention and that other arrangements may be devised by those skilled in the art without departing from the spirit of the scope of the invention.

What is claimed is:

1. A method of establishing a switching connection between a first subscriber station connected to a first switching system and a second subscriber station connected to a second switching system with a public telephone network and a private telephone network interconnecting said switching systems, comprising the steps of:
   collecting a first set of dialing digits from said first subscriber station;
   decoding a first predetermined subset of said first set to determine the telephone network specified by said dialing digits;
   determining whether said switching connection can be established through said private telephone network by interrogating a second subset of said first set and individual remaining digits of said first set upon said first predetermined subset specifying said public telephone network;
   translating said first set to a second set of dialing digits upon said switching connection being connectable through said private telephone network; and
   establishing said switching connection through said private telephone network upon said switching connection being connectable through said private telephone network utilizing said second set of dialing digits for interconnecting said first subscriber station with said second subscriber station.

2. The method of claim 1 wherein said switching connection has a facility restriction level and said first subscriber station has a facility authorization level and said determining step further comprises the steps of decoding said facility restriction level; and
   transmitting to said first subscriber station a tone signal indicating inability to complete said switching connection through said private telephone network upon said facility restriction level being greater than said facility authorization level.

3. The method of claim 2 wherein said transmitting step further comprises the steps of requesting a user authorization code from said first subscriber station upon said facility restriction level being greater than said facility authorization level of said first subscriber station;
   collecting said user authorization code from said first subscriber station; and
   said establishing step comprising the step of completing said switching connection upon said user authorization code being greater than said facility restriction level.

4. The method of claim 1 wherein a plurality of communication link groups interconnect said first switching system to said private telephone network and said method further comprises the steps of:
   decoding said second set of dialing digits for determining the optimal communication link group; and
   routing said switching connection through said public telephone network using said first set of dialing digits upon all of said communication link groups being occupied.

5. The method of claim 4 wherein said routing step further comprises the step of converting said second set of dialing digits to said first set of dialing digits for utilization in said routing step.

6. A method of determining the presence of access restriction on communication from a plurality of subscriber stations each having a facility access authorization level and connected to a switching system to a public telephone unit having a facility access restriction level via a public telephone network, comprising the steps of:
   collecting a set of dialing digits from one of said subscriber stations;
   analyzing said set of dialing digits to determine the presence of access restriction control to said public telephone unit;
   comparing said facility access restriction level with said facility access authorization level of said one of said subscriber stations; and
   transmitting to said one of said subscriber stations a tone signal indicating that said public telephone unit is unaccessible to said one of said subscriber stations upon said facility access restriction level being greater than said facility access authorization level.

7. The method of claim 6 further comprising the step of establishing a communication path between said one of said subscriber stations and said public telephone unit upon said facility access restriction level being less than said facility access authorization level.

8. The method of claim 6 further comprising the steps of
   requesting a user authorization code from said one of said subscriber stations upon said facility access authorization level of said one of said subscriber stations being less than said facility access restriction level;

collecting said user authorization code from said one of said subscriber stations; and establishing a communication path between said one of said subscriber stations and said public telephone unit upon said user authorization code being greater than or equal to said facility access restriction level.

9. The method of claim 6 wherein said analyzing step further comprises the steps of decoding a predetermined subset of said set of dialing digits to determine said presence of access restriction control; and decoding the remainder of said set of said dialing digits upon said predetermined subset of said dialing digits indicating the absence of access restriction control.

10. The method of claim 9 further comprising the step of establishing a communication path between said one of said subscriber stations and said public telephone unit upon said decoding step finding the absence of access restriction control.

11. A method of seeking a communication path from a first PBX to a second PBX with said PBXs interconnectable by a public telephone network and a private telephone network in response to a public telephone network number dialed by a subscriber station connected to said first PBX by utilizing a data structure comprising data defining public telephone network number to private telephone network location number conversion and representing private telephone network location numbers stored relative to public telephone network number information, comprising the steps of:

collecting a set of dialing digits comprising area code and office code subsets from said subscriber station defining said public telephone network number;

accessing said data structure with said dialing digits;

interrogating said data structure utilizing said area code and said office code subsets of said dialing digits to determine the availability of a communication path through said private telephone network;

searching said data structure with the remainder of said set of said dialing digits to determine the location of said private telephone network location number upon said interrogating step indicating the availability of said communication path;

retrieving the private telephone network location number from said data structure upon said communication path through said private telephone network being available; and establishing said communication path through said private telephone network utilizing said private telephone network location number upon said communication path through said private telephone network existing.

12. The method of claim 11 wherein said data structure further comprises a termination flag indicating completion of said conversion and said searching step further comprises the step of detecting said termination flag to determine the location of said private telephone network location number.

13. The method of claim 11 wherein said data structure further comprises a termination flag indicating completion of said conversion and an area code table and office code table associated with said area code and office code subsets of said dialing digits, respectively, and said area code and office code tables having memory locations having identifying area and office numbers, respectively, and indexes and digit tables each associated with an individual digit of said remainder of said set of said dialing digits and said interrogating step further comprises the steps of locating within said area code table one of said area code table memory locations whose area number matches said area code subset of said dialing digits;

utilizing the index contained within the matched one of said area code table memory locations to index into said office code table;

matching said office code subset of said dialing digits with the office number of one of said office code table memory locations; and indexing into one of said digit tables utilizing the index contained within the matched one of said office code table memory locations.

14. The method of claim 13 wherein each of said digit tables has memory locations each having a digit number and an index into the next digit table and said searching step further comprises the steps of comparing each digit of said remainder of said set of said dialing digits with the digit number of one of the memory locations of the corresponding digit table identified by the index read from the previous table; and determining the location of said private telephone network location number within said data structure upon a successful comparison of one of said remainder of said set of said dialing digits and said digit number of said one of said memory locations in said corresponding digit table and the presence of said termination flag within said corresponding digit table.

15. The method of claim 14 wherein said comparing step further comprises the step of indicating the nonavailability of said communication path through said private telephone network upon a successful comparison not being made within any of said digit tables.

16. The method of claim 15 wherein said retrieving step further comprises the step of reading said private telephone network location number from said one of said corresponding digit table memory locations' contents identified by said determining step.

17. The method of claim 16 wherein each of said digit tables comprises groups of said memory locations indexed by the index from the previous digit table or office code table and each of said indexed memory locations contains a bit position for indicating that the memory location contains the last location associated with a particular index and said indicating step comprises the step of determining whether the last location's bit position indicates said last associated location.

18. A method of determining the presence of access restriction on communication from a plurality of subscriber stations each having a facility access authorization level and connected through a PBX to a public telephone unit having a facility access restriction level via a public telephone network in response to a dialed telephone number designating said public telephone unit by utilizing a data structure comprising data defining access restriction control information stored relative to telephone number information, comprising the steps of:

collecting a set of dialing digits from one of said subscriber stations designating said public telephone unit;

accessing said data structure with said dialing digits to obtain accessed data;

analyzing said accessed data from said data structure to determine the presence of access restriction control to said public telephone unit;

comparing said facility access restriction level with said facility access authorization level of said one of said subscriber stations; and transmitting to said one of said subscriber stations a tone signal indicating that said public telephone unit is unaccessible to said one of said subscriber stations upon said facility access restriction level being greater than said facility access authorization level.

19. The method of claim 18 wherein said dialing digits comprise an area code subset of said dialing digits and an office code subset of said dialing digits and said analyzing step further comprises the steps of interrogating said data structure utilizing said area code and said office code subsets of said dialing digits to determine the possibility of access restriction control for said one of said subscriber stations; and searching said data structure with a remainder of said set of said dialing digits to determine said presence of said access restriction control upon said interrogating step indicating the possibility of said access restriction control.

20. The method of claim 19 wherein said data structure further comprises a termination flag indicating completion of said searching step and a control flag indicating said presence of access restriction control and said searching step further comprises the steps of determining the presence of said termination flag; and activating access restriction control upon encountering said control flag.

21. The method of claim 19 wherein said data structure further comprises a termination flag indicating the termination of said searching step and a control flag indicating said presence of access restriction control and an area code table and an office code table associated with said area code and said office code subsets of said dialing digits, respectively, and said area code and office code tables having memory locations having identifying area and office numbers, respectively, and indexes and digit tables each associated with an individual digit of said remainder of said set of said dialing digits and said interrogating step further comprises the steps of locating within said area code table one of said memory locations whose area number matches said area code subset of said dialing digits;

utilizing the index contained within the matched one of said area code table memory locations to index into said office code table;

matching said office code subset of said dialing digits with the office number of one of said office code table memory locations; and indexing into one of said digit tables utilizing the index contained within the matched one of said office code table memory locations.

22. The method of claim 21 wherein each of said digit tables has memory locations each having a digit number and an index into the next digit table and said searching step further comprises the steps of comparing each digit of said remainder of said set of said dialing digits with the digit number of one of said memory locations of a corresponding digit table identified by the index read from the previous table; and determining said presence of said access restriction control upon a successful comparison of one of said remainder of said set of said dialing digits and said digit number of said one of said memory locations in said corresponding digit table and the existence of said termination flag and said control flag within said one of said memory locations of said corresponding digit table.

23. The method of claim 22 wherein each of said digit tables comprises groups of said memory locations indexed by the index from the previous digit table or office code table and each of said memory locations contains a bit position for indicating that the memory location contains the last location associated with a particular index and said indicating step comprises the step of determining that the last memory location's bit position indicates the last associated location.

24. A system having a plurality of switching nodes each interconnectable by a primary telephone network and a secondary telephone network and each switching node connected to a plurality of subscriber stations;

means for collecting a first set of dialed digits from a first one of said plurality of subscriber stations connected to a first one of said switching nodes designating a second one of said plurality of subscriber stations connected to a second one of said switching nodes;

means for decoding a first predetermined subset of said first set to determine the telephone network specified by said set of dialed digits;

means for determining whether a communication path can be established through said secondary telephone network by interrogating a second subset of said first set and individual remaining digits of said first set upon said first predetermined subset specifying said primary telephone network;

means for translating said first set to a second set of digits upon said communication path being interconnectable through said secondary telephone network; and means for establishing said communication path through said secondary telephone network using said second set of digits for interconnecting said first one of said subscriber stations with said second one of said subscriber stations.

25. The system of claim 24 wherein said communication path has a facility restriction level and said first one of said subscriber stations has a facility authorization level and said determining means further comprises means for decoding said facility restriction level; and said system further comprises means for transmitting to said first one of said subscriber stations a tone signal indicating inability to complete said communication path upon said facility restriction level being greater than said facility authorization level.

26. The system of claim 25 wherein said transmitting means further comprises means for requesting a user authorization code from said first one of said subscriber stations upon said facility authorization level of said first one of said subscriber stations being less than said facility restriction level;

means for collecting said user authorization code from said first one of said subscriber stations; and means for signaling to said establishing means to establish said communication path upon said user authorization code being greater than said facility restriction level.

27. The system of claim 24 further comprising a plurality of communication link groups interconnecting said first one of said switch nodes and said secondary telephone network and means for decoding said second set of dialed digits to determine the optimal communication link group; and means for routing a second communication path through said primary telephone network using said second set of dialed digits upon all of said communication link groups being occupied.

28. The system of claim 27 wherein said routing means further comprises means for converting said second set of digits to said first set of dialed digits in order to route said second communication path via said primary telephone network.

29. A system to determine the presence of access restriction on communication from a plurality of subscriber stations each having a facility access authorization level and being interconnectable through a PBX to a public telephone unit having a facility access restriction level via a public telephone network, comprising:

means for collecting a set of dialing digits from one of said subscriber stations;

means for analyzing said set of dialing digits to determine the presence of access restriction control to said public telephone unit;

means for comparing said facility access restriction level with said facility access authorization level of said one of said subscriber stations; and means for transmitting to said one of said subscriber stations a tone signal indicating that said public telephone unit is unaccessible to said one of said subscriber stations in response to said facility access restriction level being greater than said facility access authorization level.

30. The system of claim 29 further comprising means for requesting a user access authorization code from said one of said subscriber stations upon said facility access authorization level of said one of said subscriber stations being less than said facility access restriction level;

means for collecting said user authorization code from said one of said subscriber stations; and means for establishing a communication path between said one of said subscriber stations and said public telephone unit upon said user access authorization code being greater than or equal to said facility access restriction level.

31. The system of claim 29 wherein said analyzing means further comprises means for decoding a predetermined subset of said set of dialing digits to determine said presence of access restriction control; and means for decoding the remainder of said set of said dialing digits upon said predetermined subset of said dialing digits not indicating said presence of said access restriction control to establish a communication path between said one of said subscriber stations and said public telephone unit.

* * * * *